US011893709B2

(12) United States Patent
Norouzzadeh et al.

(10) Patent No.: US 11,893,709 B2
(45) Date of Patent: Feb. 6, 2024

(54) IMAGE QUANTIZATION USING MACHINE LEARNING

(71) Applicant: Robert Bosch GmbH, Stuttgart (DE)

(72) Inventors: Mohammad Sadegh Norouzzadeh, Pittsburgh, PA (US); Renan Alfredo Rojas Gomez, Champaign, IL (US); Anh Nguyen, Auburn, AL (US); Filipe J. Cabrita Condessa, Pittsburgh, PA (US)

(73) Assignee: Robert Bosch GmbH

( * ) Notice: Subject to any disclaimer, the term of this patent is extended or adjusted under 35 U.S.C. 154(b) by 230 days.

(21) Appl. No.: 17/546,391

(22) Filed: Dec. 9, 2021

(65) Prior Publication Data

US 2023/0186429 A1 Jun. 15, 2023

(51) Int. Cl.
*G06T 3/40* (2006.01)
*G06T 7/90* (2017.01)
(Continued)

(52) U.S. Cl.
CPC ............. *G06T 3/4046* (2013.01); *G06N 3/08* (2013.01); *G06N 3/084* (2013.01); *G06T 7/90* (2017.01);
(Continued)

(58) Field of Classification Search
CPC ............. G06T 7/90; G06T 2207/10024; G06T 2207/20081; G06T 2207/20084; G06T 7/11; G06T 2207/10016; G06T 11/001; G06T 9/00; G06T 9/002; G06T 15/04; G06T 3/4046; G06N 3/045; G06N 3/08;
(Continued)

(56) References Cited

U.S. PATENT DOCUMENTS

| 2021/0058533 A1* | 2/2021 | Aggarwal | G06V 10/56 |
| 2021/0304445 A1* | 9/2021 | Yoo | H04N 1/644 |
| 2023/0053317 A1* | 2/2023 | Luo | G06V 10/82 |

OTHER PUBLICATIONS

Celebi ME. Forty years of color quantization: a modern, algorithmic survey. Artificial Intelligence Review. Apr. 27, 2023:1-82. (Year: 2023).*

(Continued)

*Primary Examiner* — Phi Hoang
*Assistant Examiner* — Scott E Sonners
(74) *Attorney, Agent, or Firm* — Dickinson Wright PLLC

(57) ABSTRACT

Methods and systems are disclosed for quantizing images using machine-learning. A plurality of input images are received from a sensor (e.g., a camera), wherein each input image includes a plurality of pixels. Utilizing an image-to-image machine-learning model, each pixel is assigned a new pixel color. Utilizing a mixer machine-learning model, each new pixel color is converted to one of a fixed number of colors to produce a plurality of quantized images, with each quantized image corresponding to one of the input images. A loss function is determined based on an alignment of each input image with its corresponding quantized image via a pre-trained reference machine-learning model. One or more parameters of the image-to-image machine-learning model and the mixer model are updated based on the loss function. The process repeats, with each iteration updating the parameters of the image-to-image machine-learning model and the mixer model, until convergence, resulting in trained models.

20 Claims, 11 Drawing Sheets

(51) Int. Cl.
*G06N 3/08* (2023.01)
*H04N 1/64* (2006.01)
*G06T 9/00* (2006.01)
*G06N 3/084* (2023.01)
*G06N 3/045* (2023.01)

(52) U.S. Cl.
CPC ............ *G06T 9/002* (2013.01); *H04N 1/644* (2013.01); *G06N 3/045* (2023.01); *G06T 2207/10028* (2013.01); *G06T 2207/20081* (2013.01); *G06T 2207/20084* (2013.01)

(58) Field of Classification Search
CPC .......... G06N 20/00; G06N 3/084; G06N 3/04; G06N 3/044; G06N 3/048; G06N 3/02; H04N 19/124; H04N 19/186; H04N 17/02; H04N 1/6058; G06V 10/56; G06V 10/82; G06V 40/162; G06V 30/162; G06F 16/5838

See application file for complete search history.

(56) References Cited

OTHER PUBLICATIONS

Hou, Yunzhong, Liang Zheng, and Stephen Gould. "Learning to structure an image with few colors." In Proceedings of the IEEE/CVF Conference on Computer Vision and Pattern Recognition, pp. 10116-10125. 2020.

Yoo, Innfarn, Xiyang Luo, Yilin Wang, Feng Yang, and Peyman Milanfar. "GIFnets: Differentiable GIF Encoding Framework." In Proceedings of the IEEE/CVF Conference on Computer Vision and Pattern Recognition, pp. 14473-14482. 2020.

Heckbert, Paul. "Color image quantization for frame buffer display." ACM Siggraph Computer Graphics 16, No. 3 (1982): 297-307.

* cited by examiner

IMAGE QUANTIZATION USING MACHINE LEARNING

TECHNICAL FIELD

The present disclosure relates to image quantization using machine learning. In embodiments, the present disclosure relates to consistent image quantization across a set of images using deep neural networks.

BACKGROUND

Image quantization and color quantization are fundamental operations in digital image processing. It is impossible to capture the infinite number of colors that can be captured through a camera lens, for example. Image quantization involves a process that reduces the number of distinct colors used in an image, usually with the intention that the new image should be as visually similar as possible to the original image. Image quantization is used in image processing, reducing the number of colors required to represent a digital image which makes it possible to reduce the file size of the image. An image with fewer colors after quantization makes subsequent downstream processes (e.g., further image processing, machine learning techniques, etc.) more feasible, limiting the computing power required.

SUMMARY

According to an embodiment, a computer-implemented method for training a machine-learning image quantization system is provided. The computer-implemented method includes the following steps: (i) receiving a plurality of input images from an image source, wherein each input image includes a plurality of pixels; (ii) utilizing an image-to-image machine-learning model to assign each pixel a new pixel color; (iii) utilizing a mixer model to map each new pixel color to one of a fixed number of colors to produce a quantized image corresponding to each input image; (iv) feeding the input images to a pre-trained reference model to produce a first set of activations; (v) feeding the quantized image to the pre-trained reference model to produce a second set of activations; (vi) computing a loss function based on a comparison between the first set of activations and the second set of activations; (vii) backpropagating the loss function into the image-to-image machine learning model and the mixer model; and (viii) outputting a trained image-to-image machine learning model and a trained mixer model after repeating steps (ii)-(vii) until convergence.

In another embodiment, a system for performing image quantization via machine learning is provided. The system includes an input interface configured to receive input images from a sensor. The system also includes one or more processors in communication with the input interface and programmed to: (i) utilize an image-to-image machine-learning model to assign each pixel of the input images a new pixel color, (ii) utilize a mixer model to map each new pixel color to one of a fixed number of colors to produce a quantized image corresponding to each input image, (iii) align each input image with its corresponding quantized image via a pre-trained reference model to determine a loss function, (iv) backpropagate the loss function into the image-to-image machine learning model and the mixer model, and (v) output a trained image-to-image machine learning model and a trained mixer model after repeating (i)-(iv) until convergence.

In yet another embodiment, a method for training an image quantization machine-learning system includes: receiving a plurality of input images, wherein each input image includes a plurality of pixels; assigning each pixel a new pixel color via an image-to-image machine-learning model; converting each new pixel color to one of a fixed number of colors via a mixer model to produce a plurality of quantized images, each quantized image corresponding to one of the input images; computing a loss function associated with an alignment of each input image with its corresponding quantized image via a pre-trained reference model; updating one or more parameters of the image-to-image machine-learning model and the mixer model based on the loss function; and outputting a trained image quantization machine-learning system utilizing the updated parameters and upon convergence.

DETAILED DESCRIPTION

Figure 1:
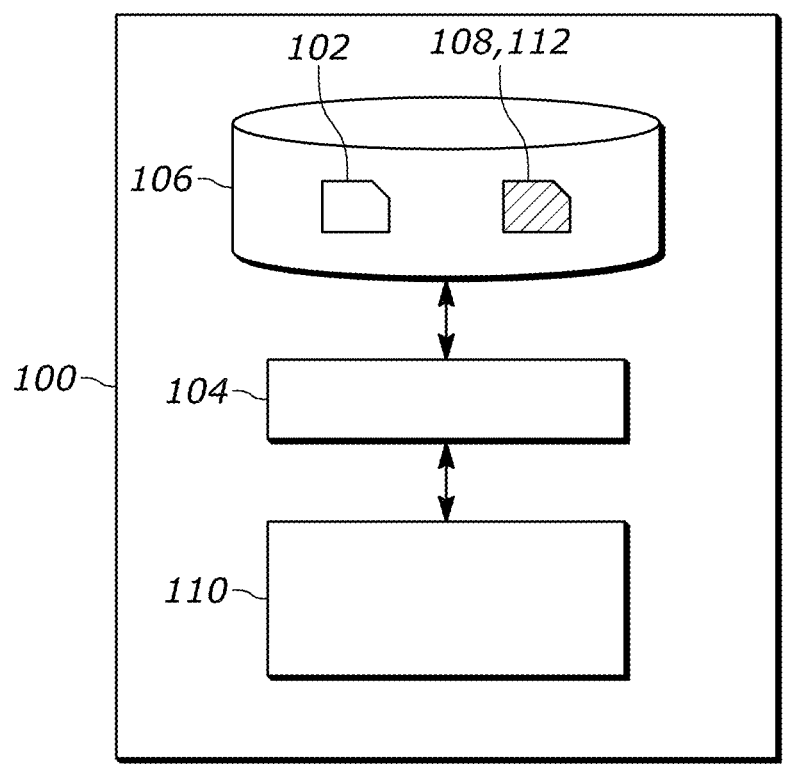
FIG. 1 shows a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Color quantization is fundamental operations in digital image processing. It is impossible to capture the infinite number of colors that can be captured through a camera lens, for example. Image quantization involves a process that reduces the number of distinct colors used in an image, usually with the intention that the new image should be as visually similar as possible to the original image. Image quantization is used in image processing, reducing the number of colors required to represent a digital image which makes it possible to reduce the file size of the image. An image with fewer colors after quantization makes subsequent downstream processes (e.g., further image processing, machine learning techniques, etc.) more feasible, limiting the computing power required.

In this disclosure, image quantization and color quantization can be used interchangeably and refer to the same process—reducing the number of distinct colors used in an image for image processing.

Color quantization aims at representing an image by using only a reduced set of K (e.g, 2, 4, 8, 16, 32) colors from N(usually 256*256*256 for RGB images) possible colors. In the process of color quantization, the number of colors output is significantly smaller (e.g., K<<N) and the total error incurred by the quantization is minimized—i.e., the reconstruction error is minimized when comparing the quantized image with the original image.

Image representations obtained under color and structure constraints (e.g., color quantization) are mostly human-centered with the aim of preserving visual similarity on human vision perception. In other words, the image is quantized with the goal of appearing substantially similar to the original to a human. This human-centric color quantization technique may not help computer algorithms with tasks where shapes and textures are crucial—for example, with object recognition and semantic segmentation in highly computerized environments, such as autonomous or semi-autonomous driving. This disclosure instead takes a data-centric approach with the aim of preserving image similarity for computer vision algorithms.

In embodiments disclosed herein, machine-learning systems such as deep neural networks are utilized to perform color quantization over a set of images (not just a single image), and the colors used in the resulting quantized images are consistent for all of the images within the set. In other words, the systems disclosed herein train a deep neural network that learns how to represent an image in a color-constraint space while keeping the discrepancy of the quantized images and the original image low in a reference task. In previous quantization methods, models pick K colors for each image; here, the system picks K colors for use in the entire set of images, which could be thousands of images for example.

For example, as will be described further, the systems disclosed herein can be trained to determine a set of colors (e.g., 2, 4, 8, 16, 32 colors) to be the maximum number of colors in the quantized image. Alternatively, the colors can be predetermined and selected without using machine learning training. Then, the same set of colors are used when quantizing an entire set of images. For example, thousands of images can be input into the machine-learning system, and the output can be a corresponding number of quantized image, with each quantized image containing the same color options, and the same maximum number of colors. In a very simplistic example, one thousand images (each with over tens of thousands of available colors for each pixel of the image) can be input in the machine learning system, and the output can be one thousand quantized images with each pixel only able to be one of four colors, and those same four colors are the only available colors for each of the thousand images.

In an embodiment, the original image is of a size W×H (width by height) and in the red green blue (RGB) color space. Each pixel in the original image is represented by three integer numbers in a [0,255] range, with each integer being one of the red, green or blue spectrum. Therefore each pixel can take one of the 256*256*256 possible values. Each pixel can therefore be represented by one of 16,777,216 possible numeric values. In the image quantizing setting, the systems herein can convert the original image to an image with the same W×H while only using C different colors, where C can be 2, 4, 8, 16, or 32 for example.

The systems disclosed herein therefore perform image quantization on a set of images, and not on only individual images independently. This approach has the following advantages. The systems disclosed herein do not require a separate optimization procedure for each individual image, and thus once the model is trained, it is faster. The set of colors selected by the systems disclosed herein is consistent across all of the images within the set. In other words, the system uses the same palette for quantizing all the images within the set. Because of this consistency, once the quantization model is trained on a sufficiently large dataset, it can be used as a data augmentation technique to improve the performance of machine-learning models in various scenarios. Because the quantization model disclosed herein is differentiable, it can be directly optimized for any downstream task such as image classification, object detection, and more. The systems disclosed herein can be utilized to compress an entire dataset while keeping the critical structure in place.

In an embodiment, a plurality of input images are received, and each image has a plurality of pixels. An image-to-image machine-learning model then assigns each pixel of each image a new pixel color on a W×H×C scale, where C is the number of base colors used as an output of a quantized image. A mixer model learns the C base colors and combines them based on the outputs of the image-to-image machine-learning model to form the quantized image. The mixer model can operate to map each new pixel color to one of a fixed number of colors to produce a quantized image. The input images are then fed into a pre-trained reference model (e.g., deep neural network) to produce a first set of activations in the nodes, and quantized image corresponding to that input image is also fed into the reference model to produce a second set of activations. A loss function is computed based on a comparison between the first set of activations and the second set of activations. The loss function can be backpropagated into the system, used in the image-to-image machine learning model and the mixer model, until convergence leads to a trained image-to-image machine learning model and mixer model. Using image quantization disclosed herein, an input image can be quantized with a reduced number of colors while preserving the information contained in the image.

Reference is now made to the embodiments illustrated in the Figures, which can apply these teachings to a machine learning model or neural network. FIG. 1 shows a system 100 for training a neural network, e.g. a deep neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

The structure of the system 100 is one example of a system that may be utilized to train the image-to-image machine-learning model and the mixer machine-learning model described herein. Additional structure for operating and training the machine-learning models is shown in FIG. 2.

Figure 2:
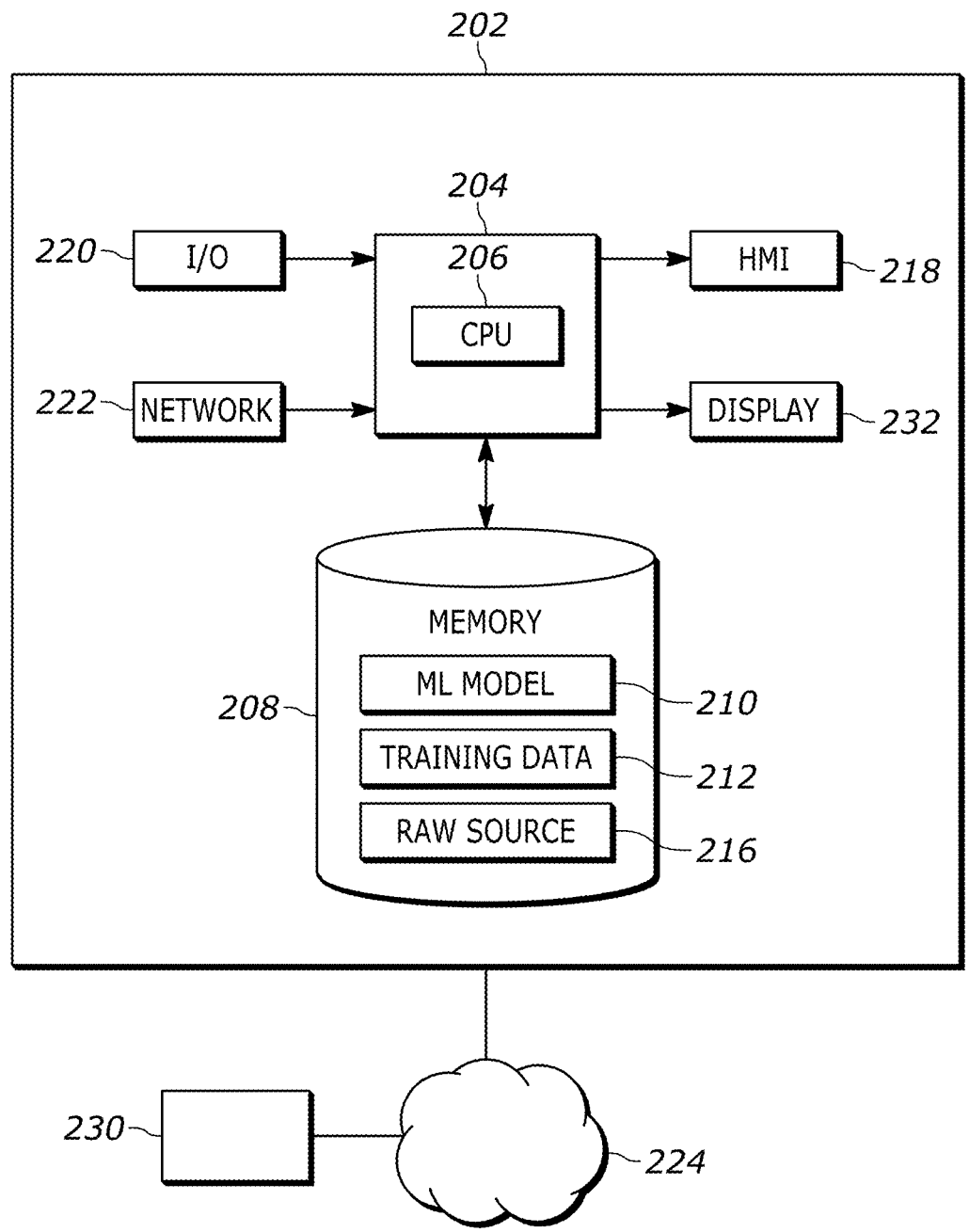
FIG. 2 shows a computer-implemented method for training and utilizing a neural network, according to an embodiment.

FIG. 2 depicts a system 200 to implement the machine-learning models described herein, for example the image-to-image machine-learning model, the mixer machine-learning model, and the pre-trained reference model described herein. The system 200 can be implemented to perform image quantization processes described herein. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuitry or BUS networks to transfer information to or between the processor(s) and storage. For example, the I/O interface 220 can include digital I/O logic lines which can be read or set by the processor(s), handshake lines to supervise data transfer via the I/O lines; timing and counting facilities, and other structure known to provide such functions. Examples of input devices include a keyboard, mouse, sensors, etc. Examples of output devices include monitors, printers, speakers, etc. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, audio or human speech, time series data (e.g., a pressure sensor signal over time), and raw or partially processed sensor data (e.g., radar map of objects). Several different examples of inputs are shown and described with reference to FIGS. 5-11. In some examples, the machine-learning algorithm 210 may be a neural network algorithm (e.g., deep neural network) that is designed to perform a predetermined function. For example, the neural network algorithm may be configured in automotive applications to identify street signs or pedestrians in images. The machine-learning algorithm(s) 210 may include algorithms configured to operate the image-to-image machine-learning model, the mixer machine-learning model, and the pre-trained reference model described herein.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include input images that include an object (e.g., a street sign). The input images may include various scenarios in which the objects are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., a reconstructed or supplemented image, in the case where image data is the input) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), or convergence, the machine-learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which supplementation results are desired. For example, the machine-learning algorithm 210 may be configured to identify the presence of a road sign in video images and annotate the occurrences. The machine-learning algorithm 210 may be programmed to process the raw source data 216 to identify the presence of the particular features. The machine-learning algorithm 210 may be configured to identify a feature in the raw source data 216 as a predetermined feature (e.g., road sign). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera.

In an example, the raw source data 216 may include image data representing an image. Applying the machine-learning algorithms (e.g., image-to-image machine learning model, mixer machine-learning model, and pre-trained reference model) described herein, the output can be a quantized version of the input image.

Figure 3:
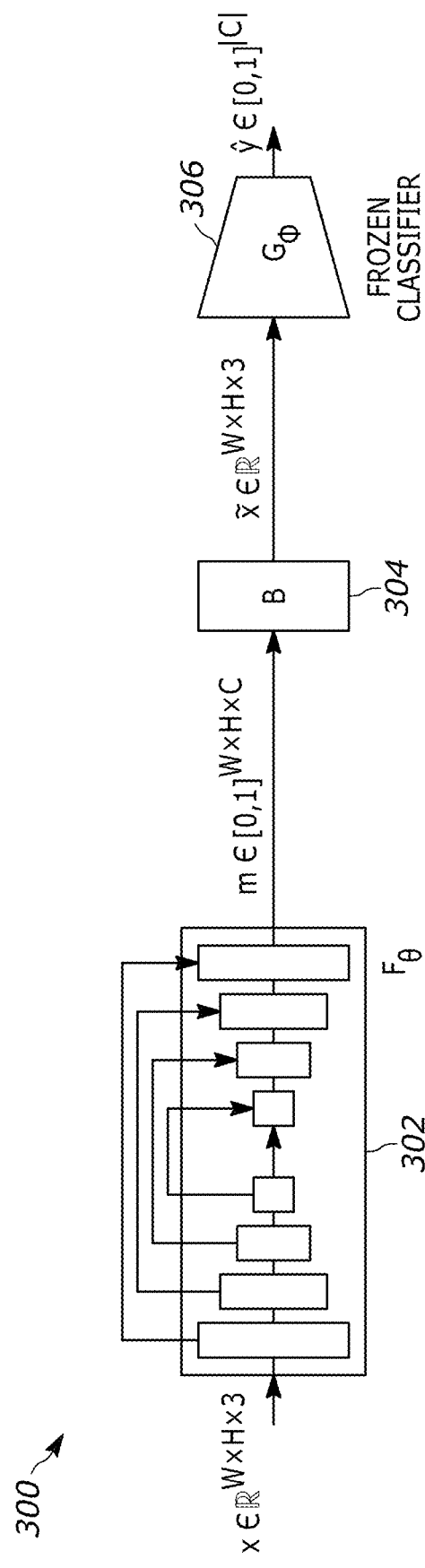
FIG. 3 shows an end-to-end quantization model including various machine learning models described herein, according to an embodiment.

Given the above description of the machine-learning models, along with the structural examples of FIGS. 1-2 configured to carry out the models, FIG. 3 illustrates a flow chart of an image quantization utilizing the machine-learning models described herein. The flow chart illustrates an end-to-end learnable image quantization model 300. The quantization model 300 includes an image-to-image machine-learning model 302, a mixer machine-learning model 304, and a pre-trained reference machine-learning model 306, which will be described in turn below.

In general, the image-to-image machine-learning model 302 outputs a number K for each pixel in each original image. Then a set of learnable colors (at B) are multiplied to produce a quantized version of the image. A classifier is trained on the entire set of input images, and then frozen (aka, frozen classifier). Then this frozen classifier is used as the pre-trained reference model 306. All of the quantized images that are generated must trigger the same response on the reference model 306 so that way the quantized version of the images are matched with the input images. The end-to-end model 300 has three sets of parameters: parameters ($\Phi$) in the frozen classifier 306 that take input images and classifies them; a set of learnable colors or color palette within the mixer model 304 (B) which is a set of K colors; and learnable parameters ($\theta$) of the image-to-image model 302.

The image-to-image machine-learning model 302 can be a deep neural network model (F) that takes an original input image and determines one of the C colors for each pixel. The number (C) of colors as well as the actual color value of the colors can be determined by the model, or can be predetermined or manually input into the model. The data x input into the image-to-image machine-learning model 302 can be a set of real numbers representing the color of each pixel of the image being of the size W×H (width by height) and in the RGB color space, thus W×H×3. The model 302 may be a segmentation model. Any image-to-image architecture can be applied in the image-to-image machine-learning model 302. In one embodiment, the image-to-image machine-learning model 302 is an encoder-decoder model using, for example, a U-Net architecture. The image-to-image machine-learning model 302 takes the input image and generates a target image by first downsampling or encoding the input image down to a bottleneck layer, then upsampling or decoding the bottleneck representation to the size of the output image. This is shown by the schematic boxes within the image-to-image machine-learning model 302 in FIG. 3. In a U-Net architecture, skip-connections are added between the encoding layers and the corresponding decoding layers, forming the U-shapes shown. The encoder and decoder of the image-to-image machine-learning model 302 can be comprised of standardized blocks of convolutional, batch normalization, dropout, and activation layers. The image-to-image machine-learning model 302 is represented by the topology in FIG. 4.

Figure 4:
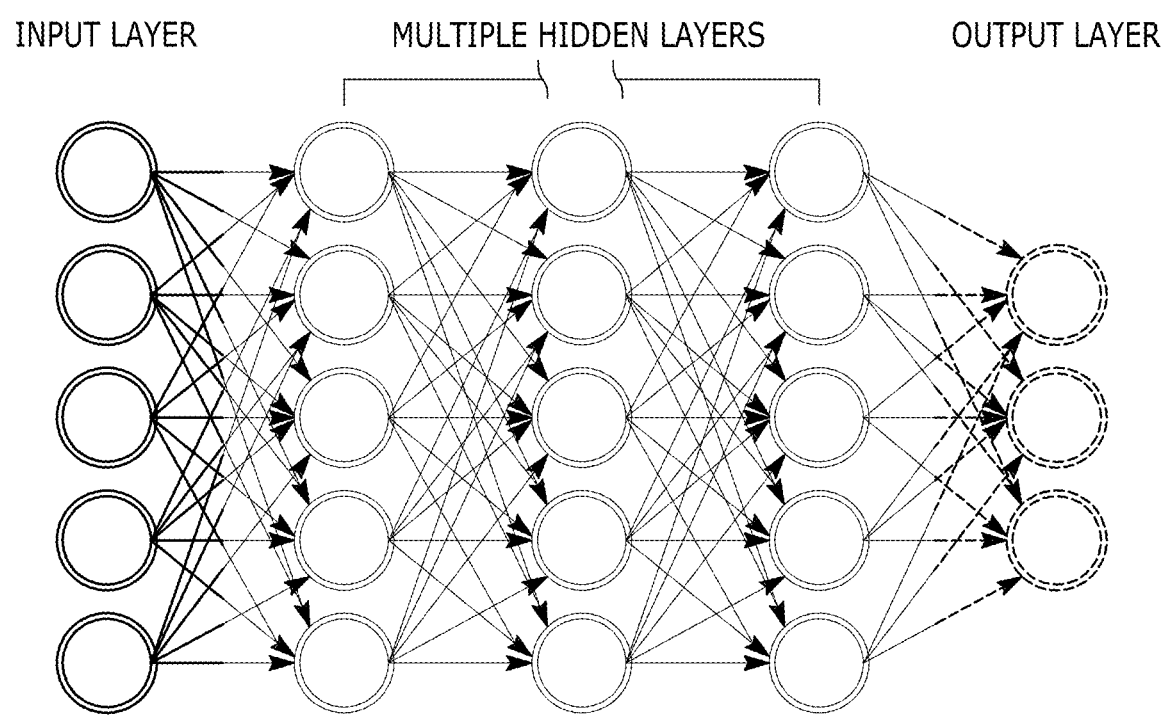
FIG. 4 shows a schematic of a deep neural network with nodes in an input layer, multiple hidden layers, and an output layer, according to an embodiment.

FIG. 4 illustrates an embodiment of the image-to-image machine-learning model 302. As discussed above, the image-to-image machine-learning model 302 may be a neural network (e.g., and in some cases, while not required, a deep neural network). The image-to-image machine-learning model 302 may be configured as a data-oriented image processing model that uses a data-oriented approach to determine a new color of each pixel of the input image for image quantization. The image-to-image machine-learning model 302 can include an input layer (having a plurality of input nodes) and an output layer (having a plurality of output nodes). In some examples, image-to-image machine-learning model 302 may include a plurality of hidden layers. The nodes of the input layer, output layer, and hidden layers may be coupled to nodes of subsequent or previous layers. And each of the nodes of the output layer may execute an activation function—e.g., a function that contributes to whether the respective nodes should be activated to provide an output of the image-to-image machine-learning model 302. The quantities of nodes shown in the input, hidden, and output layers are merely exemplary and any suitable quantities may be used.

Returning back to FIG. 3, the output m of the image-to-image machine-learning model 302 is a determination of one of the C colors for each pixel of the image. The image-to-image machine-learning model 302 thus assigns each pixel of the input image with a new pixel color such that the resulting output is in the size W×H×C where C represents a controlled, limited number of colors. A smooth approximation (e.g., utilizing a softmax function) can be applied to the outputs across the color dimension. For the image quantization system, each pixel should take only one of the C colors and not a combination of them. The softmax function therefore is applied with a high temperature factor (e.g., $0.01$) which forces the outputs to pick only one of the C colors for each pixel.

The mixer machine-learning model 304 (denoted by B, also referred to as a mixer model) then receives the output m of the image-to-image machine-learning model 302 and functions to map each new pixel color to one of a fixed number of colors to produce a quantized image. The mixer model 304 can be configured to learn the C base colors and combine them based on the outputs of the image-to-image machine-learning model 302. In an embodiment, the outputs of the image-to-image model 302 can be multiplied by a randomly initialized set of colors. The colors can alternatively bet set manually or learned from a given set of potential colors. The reference model 306 is pre-trained on the input images (RGB images with three Red, Green, and Blue channels, not quantized images), and therefore the mixer model 304 also represents the quantized images in the same RGB space. Thus, the resulting output x̃ of the mixer model 304 is a set of real numbers in the size of W×H×3 representing a quantized image of the input image.

The pre-trained reference machine-learning model 306 (also referred to as a pre-trained classifier or pre-trained reference model) then compares or aligns the output x̃ of the mixer model 304 with the input image x. In other words, the pre-trained reference model 306 aligns the quantized image and the original image so that they lead to similar response from the pre-trained reference model 306. Using a deep neural network structure, for example, the quantized image is fed into the pre-trained reference model 306 to determine the output (e.g., the activations of the neural network are captured). The original image is also fed into the pre-trained reference model 306 to determine the output (e.g., the activations of the neural network are captured).

A loss function is determined based on the two sets of activations. The loss function can be a mean squared error (MSE) or the like. The loss is used to calculate the gradients, which are used to update the weights of the image-to-image machine-learning model 302 and the mixer model 304. In an embodiment, the determined loss function is backpropagated into the image-to-image machine-learning model 302 and the mixer model 304 so that the entire end-to-end model 300 can be run again and a new loss determined. During this, the pre-trained reference model 306 remains constant or frozen. This procedure will update both the image-to-image machine-learning model 302 as well as the mixer model 304 (e.g., the color palette of the quantized image output by the mixer model 304). This process can repeat until convergence. Once convergence occurs, the resulting end-to-end machine-learning model 300 includes a trained image-to-image machine-learning model and a trained mixer model.

Once trained, the image-to-image machine-learning model 302 and the mixer model 304 can be used on a set of images for image quantization. During this, the color pallet output by the mixer model 302 will be constant for the entire set of quantized images. All quantized images output by the mixer model 302 will have colors equal to or less than the number of colors C available, and those colors are the same for the entire set of images. In other words, each quantized image output by the mixer model 302 will include an identical color palette as the other quantized images output by the mixer model 302 for the set of images. This limited availability of colors for quantization increases processing time and decreases manpower needed for quantization, which can be crucial in some circumstances.

Figure 12C:
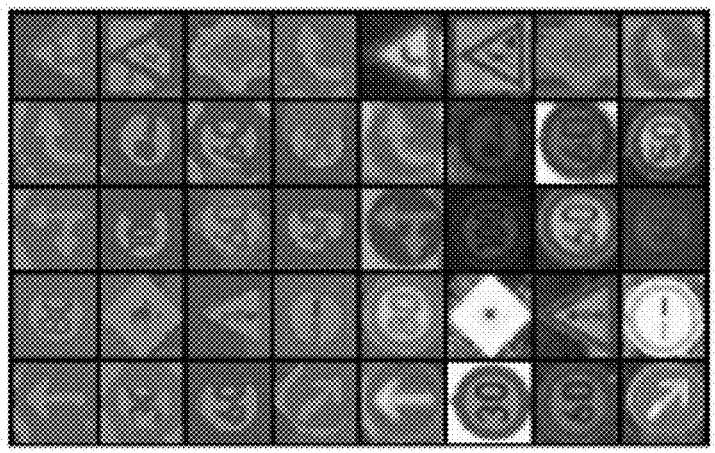
FIGS. 12A-C are examples of input images and their corresponding quantized images, varying the number of colors C used in the quantization.
Figure 12B:
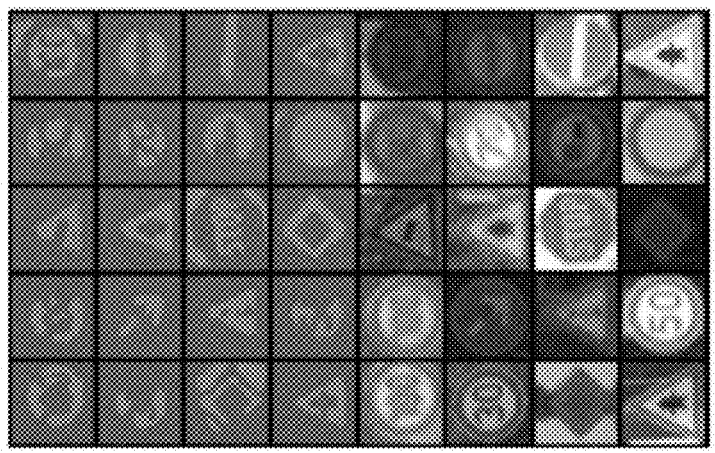
Figure 12A:
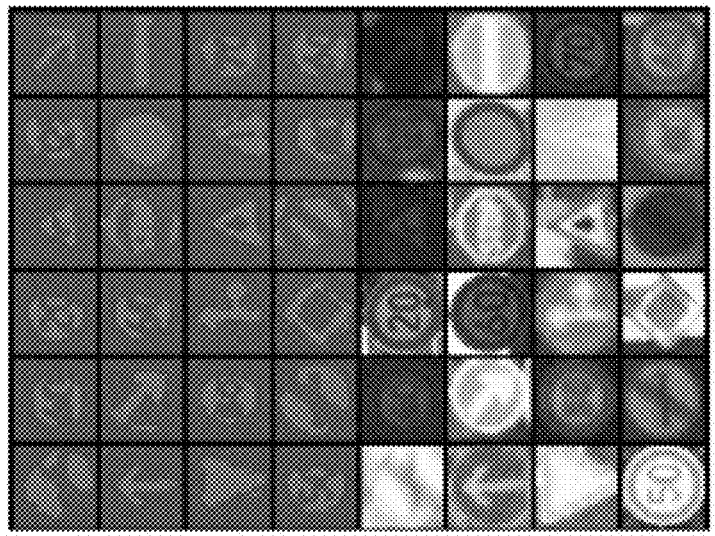

FIGS. 12A-C show three different implementations of utilizing the trained image-to-image machine learning model and mixer model once trained via the teaches described above. In each Figure, the bottom 20 images are original images of various traffic signs. For this disclosure, these original images were pulled from the German Traffic Signs Recognition Benchmark (GTSRB) dataset. And, for each Figure, the top 20 images are the corresponding quantized images resulting from using the trained models 302, 304. In FIG. 12A, only two colors are used for quantization (i.e., C=2). In other words, the quantized image only has two colors. In FIG. 12B, only four colors are used for quantization (i.e., C=4). In FIG. 12C, only eight colors are used for quantization (i.e., C=8). In a road sign environment, this quantization can be helpful for sign recognition and processing. Road signs typically only include a certain number of colors—i.e., the color palette of road signs is limited. In some jurisdictions, only eight or nine colors are authorized for use on road signs. A sign-recognition machine learning model for autonomous or semi-autonomous driving systems may be configured to determine the color of the sign for determining of what information is provided by the sign. But, physical damage, sun bleaching, dirt, water, and other factors may change the color of the sign from its original "true" color to varied color. The trained machine learning models described herein can quantize the images of these signs back to their "true" color, or some other color, so that accurate processing can take place. Also, various machine-learning models may desire to know the colors, shapes, symbols, and other indicia on the sign so that the processing system can react accordingly. For example, an autonomous or semi-autonomous vehicle may recognize a sign as being octagon shaped with letters representing S-T-O-P as a stop sign, and thus may control the vehicle to stop appropriately. Image quantization can be helpful for such sign recognition and processing, for example in semantic segmentation of images.

Figure 5:
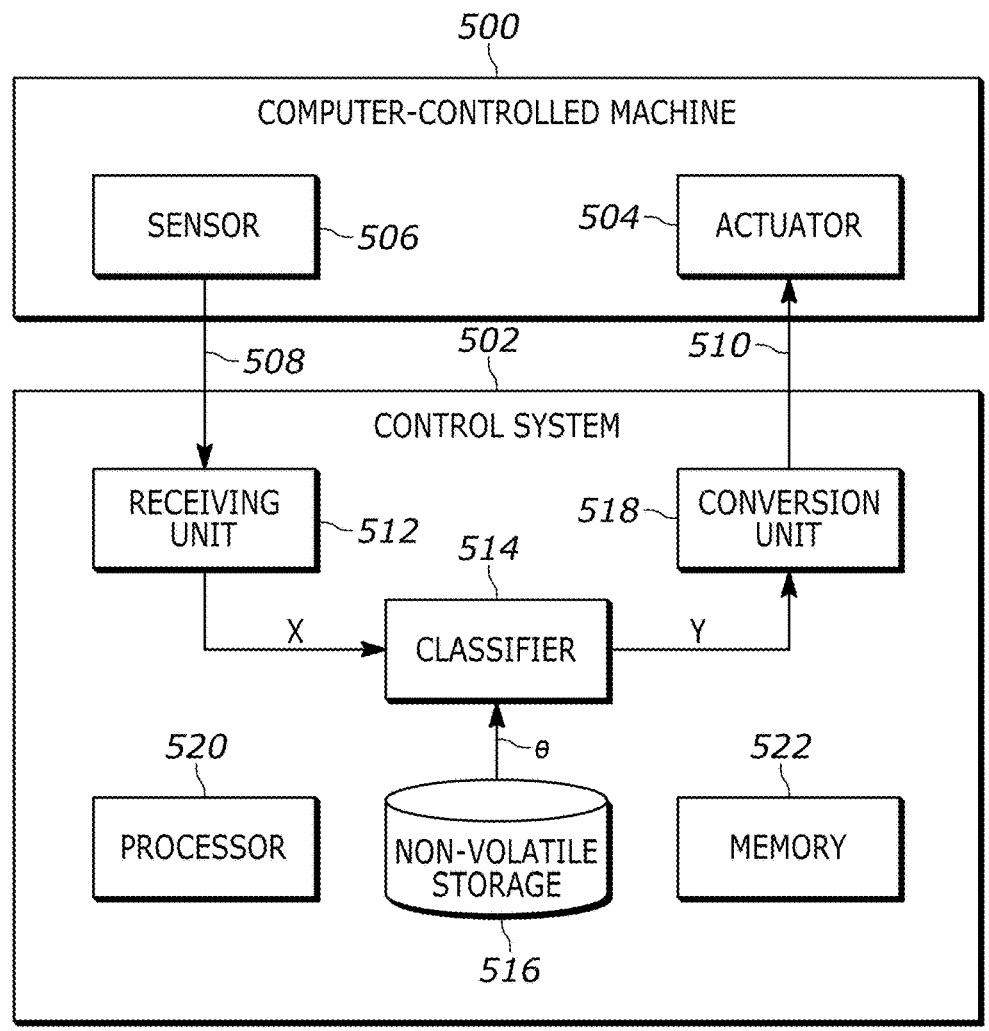
FIG. 5 depicts a schematic diagram of an interaction between a computer-controlled machine and a control system, according to an embodiment.

The machine-learning models described herein can be used in many different applications, and not just in the context of road sign image processing. Additional applications where image quantization may be used are shown in FIGS. 6-11. Structure used for training and using the machine-learning models for these applications (and other applications) are exemplified in FIG. 5. FIG. 5 depicts a schematic diagram of an interaction between a computer-controlled machine 500 and a control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes a classifier 514. Classifier 514 may be configured to classify input signals x into one or more labels using a machine learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., machine-learning algorithms, such as those described above with regard to pre-trained classifier 306) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
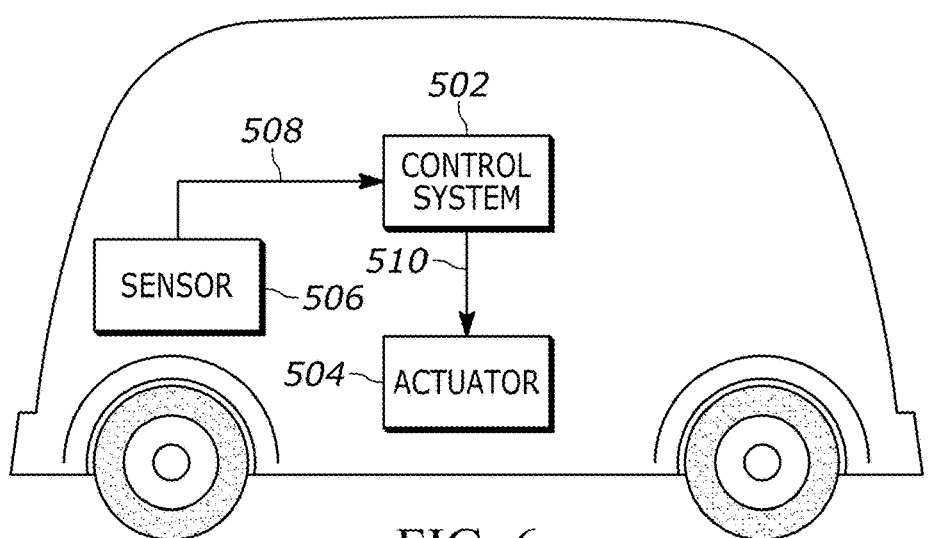
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to an embodiment.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. In the context of sign-recognition and processing as described herein, the sensor 506 is a camera mounted to or integrated into the vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
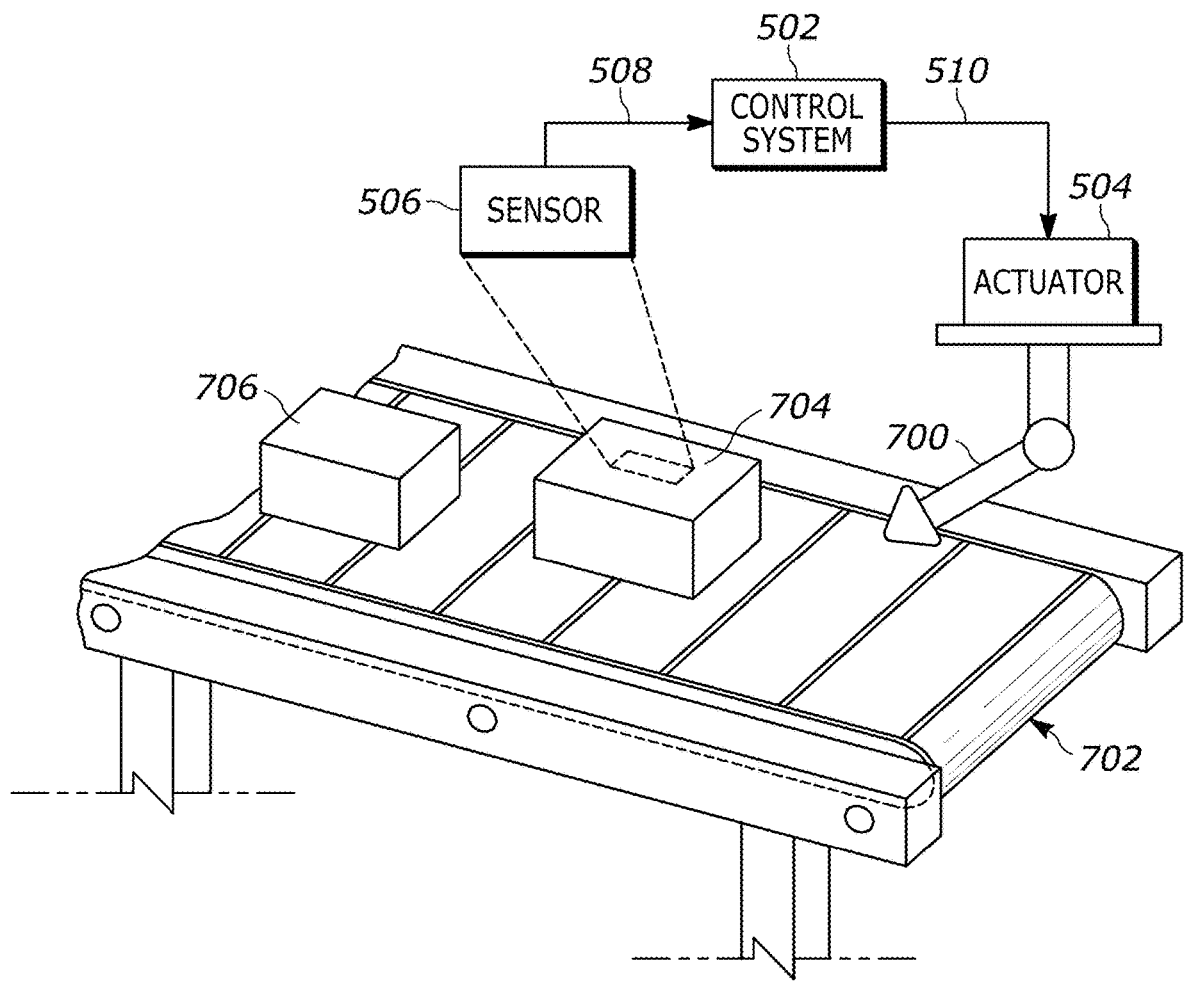
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 106 of system 700 (e.g., manufacturing machine) depending on the determined state of manufactured product 704.

Figure 8:
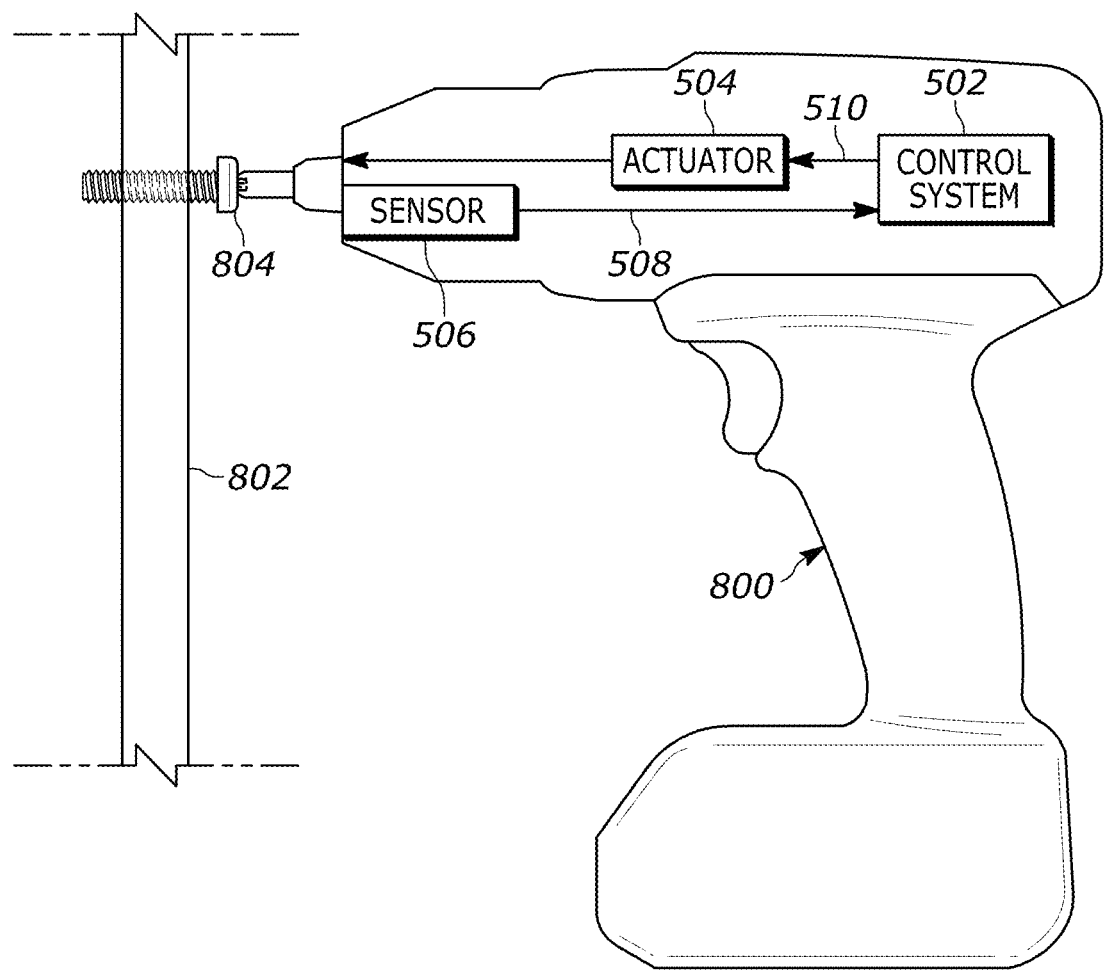
FIG. 8 depicts a schematic diagram of the control system of FIG. 5 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
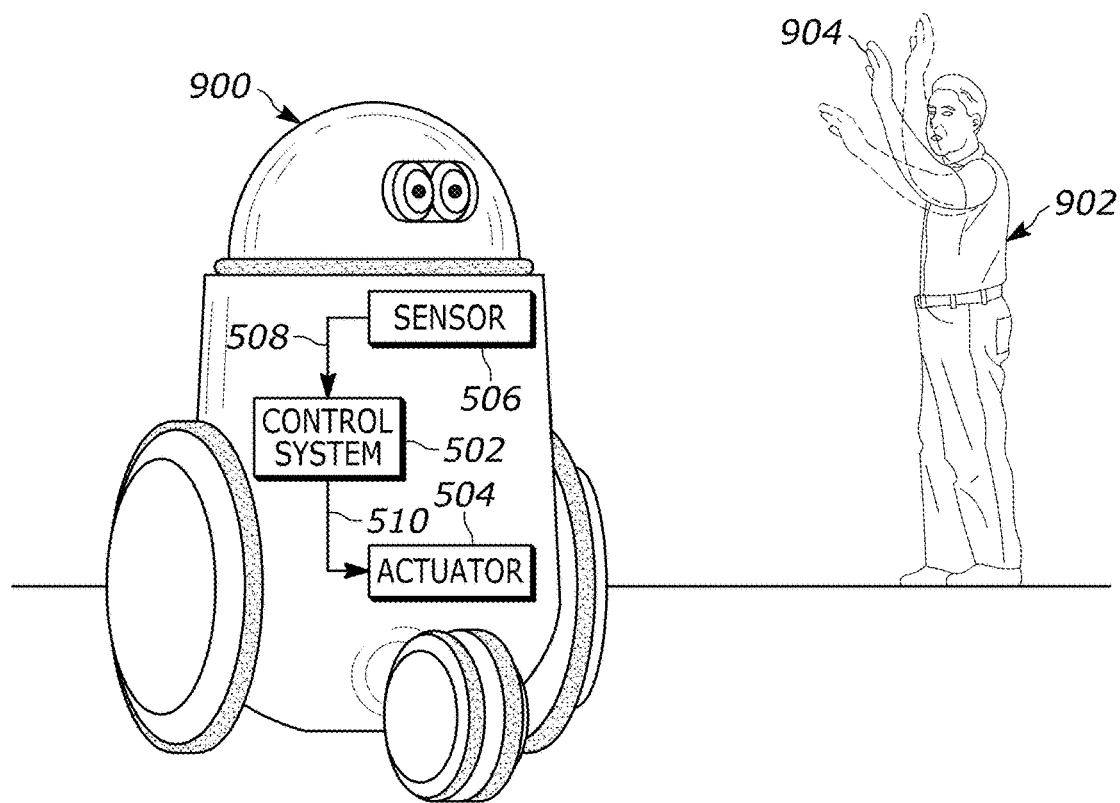
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
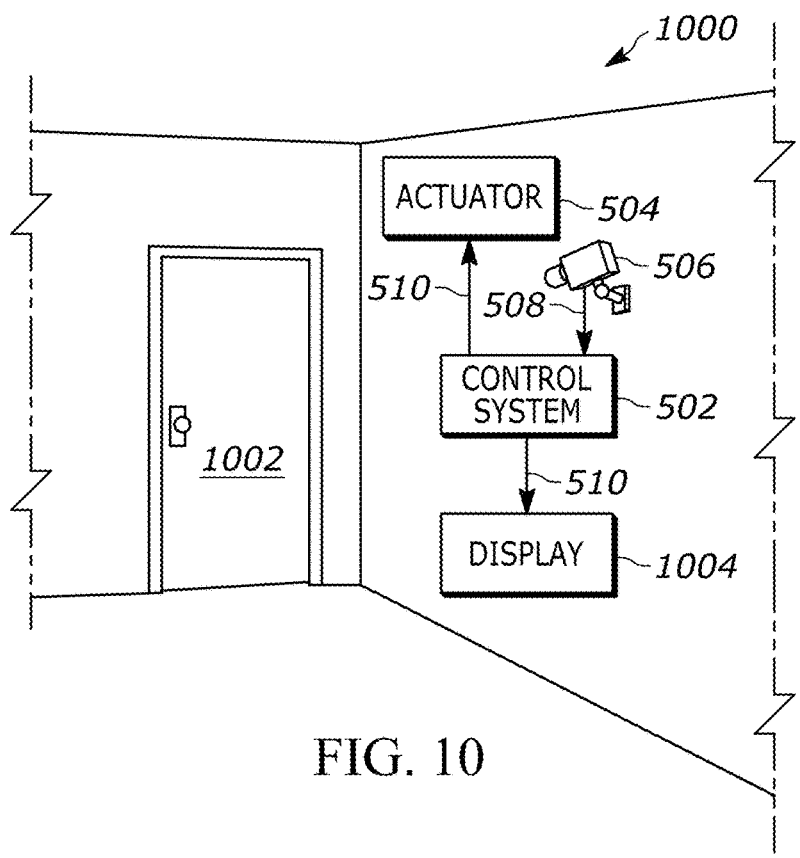
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
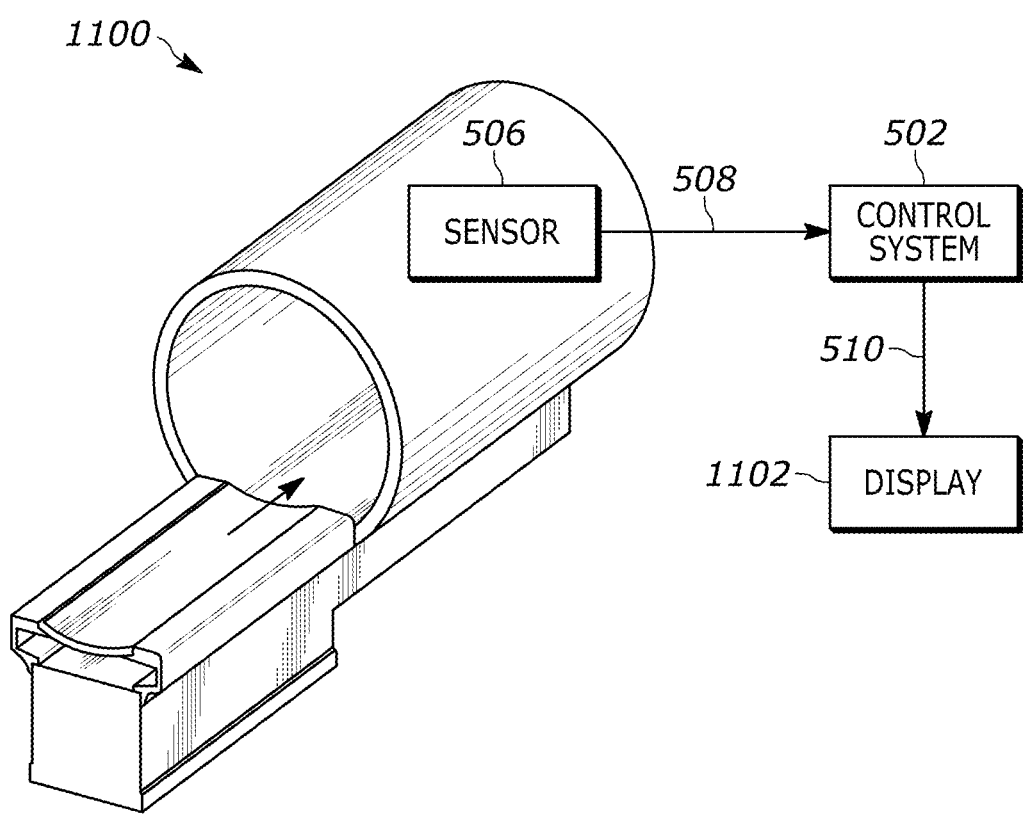
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

Figure 13:
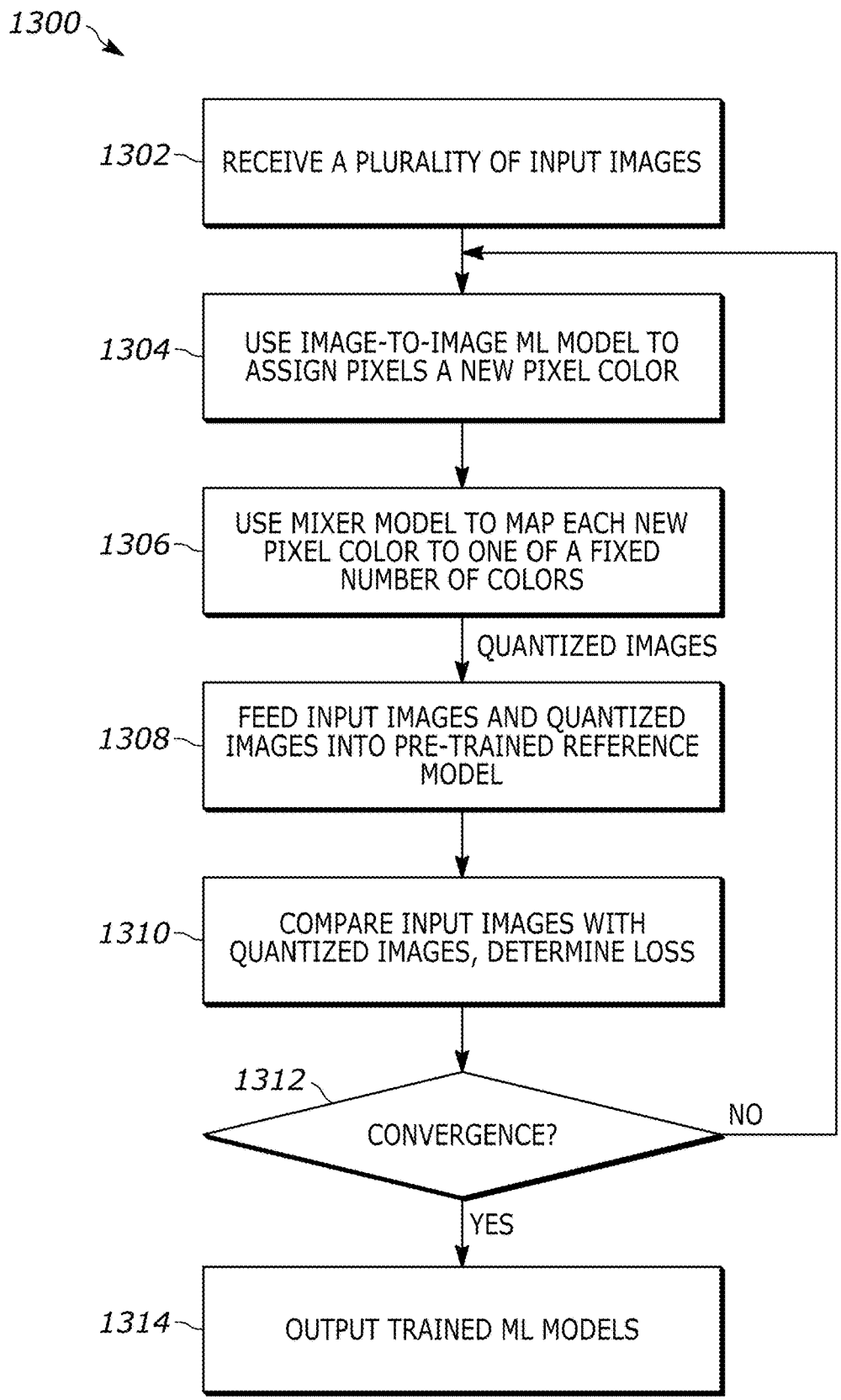
FIG. 13 is a flowchart of a method for implementing the end-to-end quantization model of FIG. 3.

FIG. 13 illustrates a flowchart 1300 of an algorithm (which may include one or more algorithms within) implemented by one or more processors described herein. At 1302, the processor(s) receive a plurality of input images. The input images can be in the RGB space, having a size of W×H×3. The images may be from a sensor 506, such as a camera. At 1304, an image-to-image machine-learning model 302 is utilized to assign the pixels of each image with a new pixel color. The image-to-image machine-learning model 302 can be an encoder-decoder model (e.g., U-Net architecture) to scale and produce data with newly assigned pixel color for each pixel. A softmax function can be applied to the outputs of the image-to-image machine-learning model 302 so that each pixel takes only one of the C colors and not a combination of them. The output of the image-to-image machine-learning model 302 is fed into the mixer model 304 where, at 1306, the mixer model maps each new pixel color to one of a fixed number of colors C. The number of new colors (C) and the colors themselves can be determined by the model, or manually input. This produces a plurality of quantized images, with each quantize image corresponding to one of the input images.

At 1308, the quantized images are fed into a pre-trained reference model (e.g., frozen classifier) 306, along with the input images. The reference model 306 compares the input images with the quantized images at 1310, and determines a loss function. After multiple iterations, convergence can be monitored. If there is no convergence determined at 1312, the loss function is backpropagated into the image-to-image machine-learning model 302 and the mixer model 304 so that the resulting color palette is updated and the models are run again (while the pre-trained reference model is not updated but rather its parameters are maintained). This process continues until convergence is determined at 1312, thus resulting in an output of a trained image-to-image machine learning model and a trained mixer model.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for training a machine-learning image quantization system, the computer-implemented method comprising the following steps:
   (i) receiving a plurality of input images from an image source, wherein each input image includes a plurality of pixels;
   (ii) utilizing an image-to-image machine-learning model to assign each pixel a new pixel color;
   (iii) utilizing a mixer model to map each new pixel color to one of a fixed number of colors to produce a quantized image corresponding to each input image;
   (iv) feeding the input images to a pre-trained reference model to produce a first set of activations;
   (v) feeding the quantized image to the pre-trained reference model to produce a second set of activations;
   (vi) computing a loss function based on a comparison between the first set of activations and the second set of activations;
   (vii) backpropagating the loss function into the image-to-image machine learning model and the mixer model; and
   (viii) outputting a trained image-to-image machine learning model and a trained mixer model after repeating steps (ii)-(vii) until convergence.

2. The computer-implemented method of claim 1, further comprising:
   use the trained image-to-image machine learning model and the trained mixer model to quantize a set of images.

3. The computer-implemented method of claim 2, wherein colors output by the mixer model are constant throughout the quantizing of the set of images.

4. The computer-implemented method of claim 1, wherein colors of the fixed number of colors are selected manually.

5. The computer-implemented method of claim 1, wherein the colors of the fixed number of colors are determined by the image-to-image machine-learning model.

6. The computer-implemented method of claim 1, wherein the step of utilizing a mixer includes multiplying an output of the image-to-image machine-learning model by a randomly initialized set of colors.

7. The computer-implemented method of claim 1, wherein parameters of the pre-trained reference model do not change during the repeating of steps (ii)-(vi).

8. The computer-implemented method of claim 1, wherein the image source is a camera, a lidar device, or a radar device.

9. A system for performing image quantization via machine learning, the system comprising:
   an input interface configured to receive input images from a sensor; and
   one or more processors in communication with the input interface, the one or more processors programmed to:
   (i) utilize an image-to-image machine-learning model to assign each pixel of the input images a new pixel color,
   (ii) utilize a mixer model to map each new pixel color to one of a fixed number of colors to produce a quantized image corresponding to each input image,
   (iii) align each input image with its corresponding quantized image via a pre-trained reference model to determine a loss function, (iv) backpropogate the loss function into the image-to-image machine learning model and the mixer model, and (v) output a trained image-to-image machine learning model and a trained mixer model after repeating (i)-(iv) until convergence.

10. The system of claim 9, wherein the aligning of each input image with its corresponding quantized image includes:

feeding the input image to the pre-trained reference model to produce a first set of activations;

feeding the quantized image to the pre-trained reference model to produce a second set of activations; and deriving the loss function based on a comparison between the first set of activations and the second set of activations.

11. The system of claim 9, wherein the one or more processors is further programmed to:

use the trained image-to-image machine learning model and the trained mixer model to quantize a set of images.

12. The system of claim 11, wherein colors output by the mixer model are constant through the quantizing of the set of images.

13. The system of claim 9, wherein the colors of the fixed number of colors are selected manually.

14. The system of claim 9, wherein the colors of the fixed number of colors are determine by the image-to-image machine-learning model.

15. The system of claim 9, wherein the utilizing of the mixer model includes multiplying an output of the image-to-image machine-learning model by a randomly initialized set of colors.

16. The system of claim 9, wherein parameters of the pre-trained reference model do not change during the utilizing the image-to-image machine learning model, the utilizing the mixer model, and the aligning each input image with its corresponding quantized image.

17. The system of claim 9, wherein the sensor is a camera, a lidar device, or a radar device.

18. A vehicle configured to utilize an image quantization machine-learning model, the vehicle comprising:

a sensor configured to capture an image; and one or more processors communicatively coupled to the sensor and to memory, wherein the one or more processors are configured to utilize an image quantization machine-learning model to process the image, wherein the image quantization machine-learning model is trained according to the following steps:

receiving a plurality of input images, wherein each input image includes a plurality of pixels;

assigning each pixel a new pixel color via an image-to-image machine-learning model;

converting each new pixel color to one of a fixed number of colors via a mixer model to produce a plurality of quantized images, each quantized image corresponding to one of the input images;

computing a loss function associated with an alignment of each input image with its corresponding quantized image via a pre-trained reference model;

updating one or more parameters of the image-to-image machine-learning model and the mixer model based on the loss function; and outputting a trained image quantization machine-learning system utilizing the updated parameters and upon convergence.

19. The vehicle of claim 18, wherein the one or more processors is further programmed to use the trained image quantization machine-learning system to quantize a set of images received from the sensor, wherein colors output by the mixer model are constant throughout the quantizing of the set of images.

20. The vehicle of claim 18, wherein parameters of the pre-trained reference model do not change during the steps of assigning, converting, computing, and updating.

* * * * *